(12) United States Patent
Habermann et al.

(10) Patent No.: US 8,516,200 B2
(45) Date of Patent: Aug. 20, 2013

(54) AVOIDING CROSS-INTERROGATES IN A STREAMING DATA OPTIMIZED L1 CACHE

(75) Inventors: Christian Habermann, Stuttgart (DE); Christian Jacobi, Schoenaich (DE); Martin Recktenwald, Steinenbronn (DE); Hans-Werner Tast, Weil im Schoenbuch (DE)

(73) Assignee: International Business Machines Corporation, Armonk, NY (US)

( * ) Notice: Subject to any disclaimer, the term of this patent is extended or adjusted under 35 U.S.C. 154(b) by 408 days.

(21) Appl. No.: 12/876,366

(22) Filed: Sep. 7, 2010

(65) Prior Publication Data

US 2012/0059996 A1    Mar. 8, 2012

(51) Int. Cl.
*G06F 12/00*    (2006.01)

(52) U.S. Cl.
USPC ............................ 711/141; 711/156; 711/124

(58) Field of Classification Search
USPC .......................................... 711/124, 141, 156
See application file for complete search history.

(56) References Cited

U.S. PATENT DOCUMENTS

| | | | |
|---|---|---|---|
| 5,426,754 A | 6/1995 | Grice et al. | |
| 5,490,261 A | 2/1996 | Bean et al. | |
| 7,577,795 B2 | 8/2009 | Hutton et al. | |
| 7,941,610 B2 * | 5/2011 | Handgen et al. | 711/144 |
| 2009/0006770 A1 * | 1/2009 | Blumrich et al. | 711/146 |
| 2009/0157965 A1 | 6/2009 | Shum et al. | |
| 2009/0204763 A1 | 8/2009 | Shum et al. | |
| 2009/0216949 A1 * | 8/2009 | Krumm et al. | 711/122 |
| 2009/0216951 A1 | 8/2009 | Shum et al. | |
| 2009/0240889 A1 | 9/2009 | Choy et al. | |
| 2011/0296114 A1 * | 12/2011 | Farrell et al. | 711/145 |

OTHER PUBLICATIONS

Hoevel, LW et al., "Mechanism for Avoiding Unnecessary Cross Interrogates", Ip.com, Feb. 2005, 2 pages.

* cited by examiner

*Primary Examiner* — Jared Rutz
(74) *Attorney, Agent, or Firm* — Stephen R. Tkacs; Stephen J. Walder, Jr.; Diana R. Gerhardt

(57) ABSTRACT

A mechanism is provided for avoiding cross-interrogates for a streaming data optimized level one cache. The mechanism adds a set of dedicated registers, referred to as "copex registers," to track ownership of the cache lines that the co-processor's L1 cache holds exclusive. The mechanism extends the cache directory of the L2 cache by a bit that identifies exclusive ownership of a cache line in the co-processor cache. The co-processor continuously provides an indication of which copex registers are valid. On any action that requires a directory lookup in the L2 cache, the mechanism compares the valid copex registers against the lookup address in parallel to the directory lookup. The mechanism considers the "exclusive ownership in co-processor" bit in the directory valid only if the cache line is also currently in a valid copex register.

20 Claims, 3 Drawing Sheets

AVOIDING CROSS-INTERROGATES IN A STREAMING DATA OPTIMIZED L1 CACHE

BACKGROUND

The present application relates generally to an improved data processing apparatus and method and more specifically to mechanisms for avoiding cross-interrogates in a streaming data optimized L1 cache.

On-chip co-processors are becoming increasingly popular to solve standard problems with specialized hardware attached to general purpose processing cores. Often, these co-processors work on data that has streaming characteristics, such as encryption, decryption, compression, etc. Potentially, co-processors create very large amounts of data in sequentially increasing memory addresses and make this data available to processor cores on the same chip, on other chips in a multiple chip environment, and/or written back into memory.

Existing solutions either provide a special store path directly into one or multiple processor cores in the same chip and let the processor core take care of storing the data through its normal store mechanisms or add another level one (L1) cache level for the co-processor, referred to as the "COP cache," into the storage hierarchy and take care of data transfer through existing, well-known cache/memory hierarchy means.

Providing a special store path adds considerable functional complexity, and due to limitations of available silicon area and wiring constraints, the special store path is typically a narrow and slow path that is not well-suited for streaming data.

Adding another L1 cache level means that the co-processor's L1 cache has to get write (exclusive) access to a cache line. In existing implementations, this implies that any other L1 cache that needs access to the data must send special invalidation requests (exclusive cross-interrogates (XIs)) to the co-processor's L1 cache. The cache line may only be used if these XIs are acknowledged by the COP-cache, or there is an implicit scheme that assumes an acknowledge after some specified time. Because this always involves waiting for each cache line that was in use in the COP-cache, these XIs have significant performance impact.

SUMMARY

In one illustrative embodiment, a method, in a data processing system, is provided for avoiding cross-interrogates for a streaming data optimized cache. The method comprises receiving from a first processor a fetch operation for a cache line to be exclusively held by the first processor. The fetch operation includes a fetch address. The method further comprises receiving from the first processor an indication of a selected register from a set of registers for which the fetch operation is intended and writing the fetch address into the selected register. Responsive to receiving an operation from a second processor requiring cache directory lookup for a lookup address, the method comprises performing a comparison of the lookup address to the set of registers and determining whether the first processor exclusively owns a cache line corresponding to the lookup address based on the comparison.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
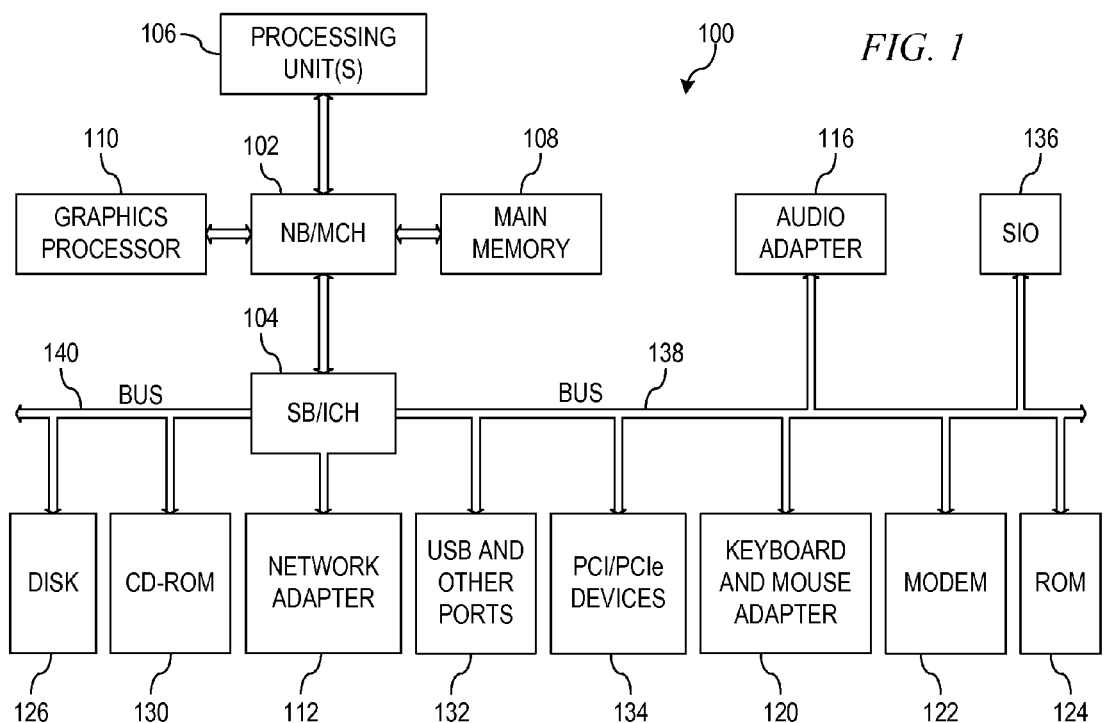
FIG. 1 is a block diagram of an example data processing system in which aspects of the illustrative embodiments may be implemented.

The illustrative embodiments provide a mechanism for avoiding cross-interrogates for a streaming data optimized level one cache. The mechanism adds a set of dedicated registers, referred to as "copex registers," to track ownership of the cache lines that the co-processor's L1 cache holds exclusive. The mechanism extends the cache directory of the L2 cache by a bit that identifies exclusive ownership of a cache line in the COP cache. The co-processor continuously provides an indication of which copex registers are valid. On any action that requires a directory lookup in the L2 cache, the L2 cache compares the valid copex registers against the lookup address in parallel to the directory lookup. The L2 cache considers the "exclusive ownership in co-processor" bit in the directory valid only if the cache line is also currently in a valid copex register.

With the mechanism of the illustrative embodiments, the co-processor can be attached to the store path in the L2 cache like any other L1 cache that supports stores. The co-processor is permitted to generate stores as long as it has exclusive ownership of the line. In this case, the co-processor has exclusive ownership of the line as long as the co-processor did not receive an cross-interrogate (XI) for the line or the co-processor did not turn off the valid bit for the appropriate copex register.

The advantage over existing L1 cache implementation is that XIs are not necessary if the co-processor does not have the copex register valid bit asserted for a given line. For existing L1 cache structures, the L2 cache would have to send such an XI and wait for an acknowledge from the COP-cache or a fixed time to make sure that it stopped generating stores for the line before it is handed over to someone else. It should be noted that it is the normal case for many co-processor operations that after the operation, "someone else"—i.e., a general purpose core in the system that is attached to the same coherent cache hierarchy—wants to have the newly generated data. Also, even during the operation of the co-processor, the mechanism of the illustrative embodiments will automatically never hold more cache lines exclusive in the co-processor than there are copex registers available. This is useful for streaming data where only a very limited set of cache lines are worked on in parallel. For example, the co-processor may generate stores for line <x> and already fetch a second line <x+1> while working on line <x> to hide the L2 cache's latency. For a normal streaming operation, the co-processor may then generate stores for line <x+1>, and already fetch a third line <x+2> while working on line <x+1>, and so on. For such a mode of operation, there would never be a need to hold more than two lines exclusively owned in the co-processor's L1 cache.

The illustrative embodiments may be utilized in many different types of data processing environments including a distributed data processing environment, a single data processing device, or the like. In order to provide a context for the description of the specific elements and functionality of the illustrative embodiments, FIG. 1 is provided hereafter as example environments in which aspects of the illustrative embodiments may be implemented.

FIG. 1 is a block diagram of an example data processing system in which aspects of the illustrative embodiments may be implemented. Data processing system 100 is an example of a computer in which computer usable code or instructions implementing the processes for illustrative embodiments of the present invention may be located.

In the depicted example, data processing system 100 employs a hub architecture including north bridge and memory controller hub (NB/MCH) 102 and south bridge and input/output (I/O) controller hub (SB/ICH) 104. Processing unit 106, main memory 108, and graphics processor 110 are connected to NB/MCH 102. Graphics processor 110 may be connected to NB/MCH 102 through an accelerated graphics port (AGP).

Processing unit 106 may be a multiple core processing unit, for example. In one embodiment, processing unit may have one or more general processor cores and one or more co-processor cores. Alternatively, data processing system 100 may comprise a plurality of processing units 106, where each processing unit 106 may be a processor or a co-processor. In another embodiment, data processing system 100 may comprise a plurality of processing units 106, where each processing unit 106 comprises one or more general processor cores and one or more co-processor cores.

In the depicted example, local area network (LAN) adapter 112 connects to SB/ICH 104. Audio adapter 116, keyboard and mouse adapter 120, modem 122, read only memory (ROM) 124, hard disk drive (HDD) 126, CD-ROM drive 130, universal serial bus (USB) ports and other communication ports 132, and PCI/PCIe devices 134 connect to SB/ICH 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash basic input/output system (BIOS).

HDD 126 and CD-ROM drive 130 connect to SB/ICH 104 through bus 140. HDD 126 and CD-ROM drive 130 may use, for example, an integrated drive electronics (IDE) or serial advanced technology attachment (SATA) interface. Super I/O (SIO) device 136 may be connected to SB/ICH 104.

An operating system runs on processing unit 106. The operating system coordinates and provides control of various components within the data processing system 100 in FIG. 1. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 100 (Java is a trademark of Sun Microsystems, Inc. in the United States, other countries, or both).

As a server, data processing system 100 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 100 may be a symmetric multiprocessor (SMP) system including a plurality of processors in processing unit 106. Alternatively, a single processor system may be employed.

Instructions for the operating system, the object-oriented programming system, and applications or programs are located on storage devices, such as HDD 126, and may be loaded into main memory 108 for execution by processing unit 106. The processes for illustrative embodiments of the present invention may be performed by processing unit 106 using computer usable program code, which may be located in a memory such as, for example, main memory 108, ROM 124, or in one or more peripheral devices 126 and 130, for example.

A bus system, such as bus 138 or bus 140 as shown in FIG. 1, may be comprised of one or more buses. Of course, the bus system may be implemented using any type of communication fabric or architecture that provides for a transfer of data between different components or devices attached to the fabric or architecture. A communication unit, such as modem 122 or network adapter 112 of FIG. 1, may include one or more devices used to transmit and receive data. A memory may be, for example, main memory 108, ROM 124, or a cache such as found in NB/MCH 102 in FIG. 1.

Those of ordinary skill in the art will appreciate that the hardware in FIG. 1 may vary depending on the implementation. Other internal hardware or peripheral devices, such as flash memory, equivalent non-volatile memory, or optical disk drives and the like, may be used in addition to or in place of the hardware depicted in FIG. 1. Also, the processes of the illustrative embodiments may be applied to a multiprocessor data processing system, other than the SMP system mentioned previously, without departing from the spirit and scope of the present invention.

Moreover, the data processing system 100 may take the form of any of a number of different data processing systems including client computing devices, server computing devices, a tablet computer, laptop computer, telephone or other communication device, a personal digital assistant (PDA), or the like. In some illustrative examples, data processing system 100 may be a portable computing device which is configured with flash memory to provide non-volatile memory for storing operating system files and/or user-generated data, for example. Essentially, data processing system 100 may be any known or later developed data processing system without architectural limitation.

Figure 2:
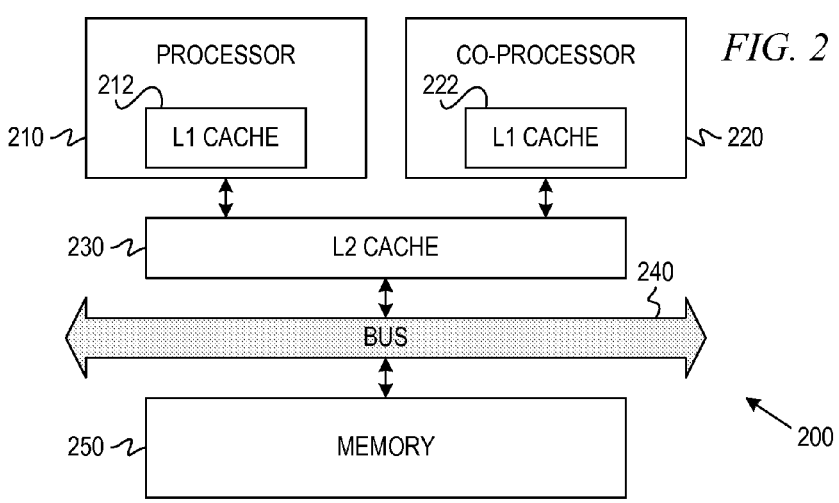
FIG. 2 is a block diagram of an example processor, cache, and memory configuration in which aspects of the illustrative embodiments may be implemented.

FIG. 2 is a block diagram of an example processor, cache, and memory configuration in which aspects of the illustrative embodiments may be implemented. Data processing system 200 includes processor 210 and co-processor 220 connected to bus 240 via level two (L2) cache 230. Data processing system 200 also includes memory 250 connected to bus 240. Processor 210 has level one (L1) cache 212, and co-processor 220 has L1 cache 222. While the depicted example shows one processor and one co-processor, data processing system 200 may include any number of processors and co-processors.

Data processing system 200 may be a system-on-a-chip such that processor 210, co-processor 220, L2 cache 230, and bus 240 are embodied on one integrated circuit chip, such as processing unit 106 in FIG. 1. Memory 250 may be integrated in the system-on-a-chip or, alternatively, a memory controller (not shown) may be integrated in the system-on-a-chip. In an alternative embodiment, processor 210 and co-processor 220 may be processing cores in a multiple core processor. In yet another embodiment, processor 210 and co-processor 220 may be separate chips accessing memory 250 via a shared cache, L2 cache 230 in this example.

Co-processor 220 may be a specialized processor that works on data with streaming characteristics, such as encryption, decryption, compression, etc. Co-processor 220 may create potentially very large amounts of data in sequentially increasing memory addresses. Co-processor 220 may need to make this data available to processor 210 or other processor cores on the same chip or on other chips in a multiple chip environment. Co-processor 220 may also need to write this data back into memory 250.

In accordance with an illustrative embodiment, L2 cache 230 provides a mechanism for avoiding cross-interrogates for a streaming data optimized level one cache. L2 cache 230 adds a set of dedicated registers, referred to as "copex registers," to track ownership of the cache lines that the co-processor's L1 cache 222 holds exclusive. The mechanism extends the cache directory of the L2 cache 230 by a bit that identifies exclusive ownership of a cache line in the co-processor cache 222. The co-processor 220 continuously provides an indication of which copex registers are valid. On any action that requires a directory lookup in the L2 cache 230, the L2 cache 230 compares the valid copex registers against the lookup address in parallel to the directory lookup. The L2 cache 230 considers the "exclusive ownership in co-processor" bit in the directory valid only if the cache line is also currently in a valid copex register.

Figure 3:
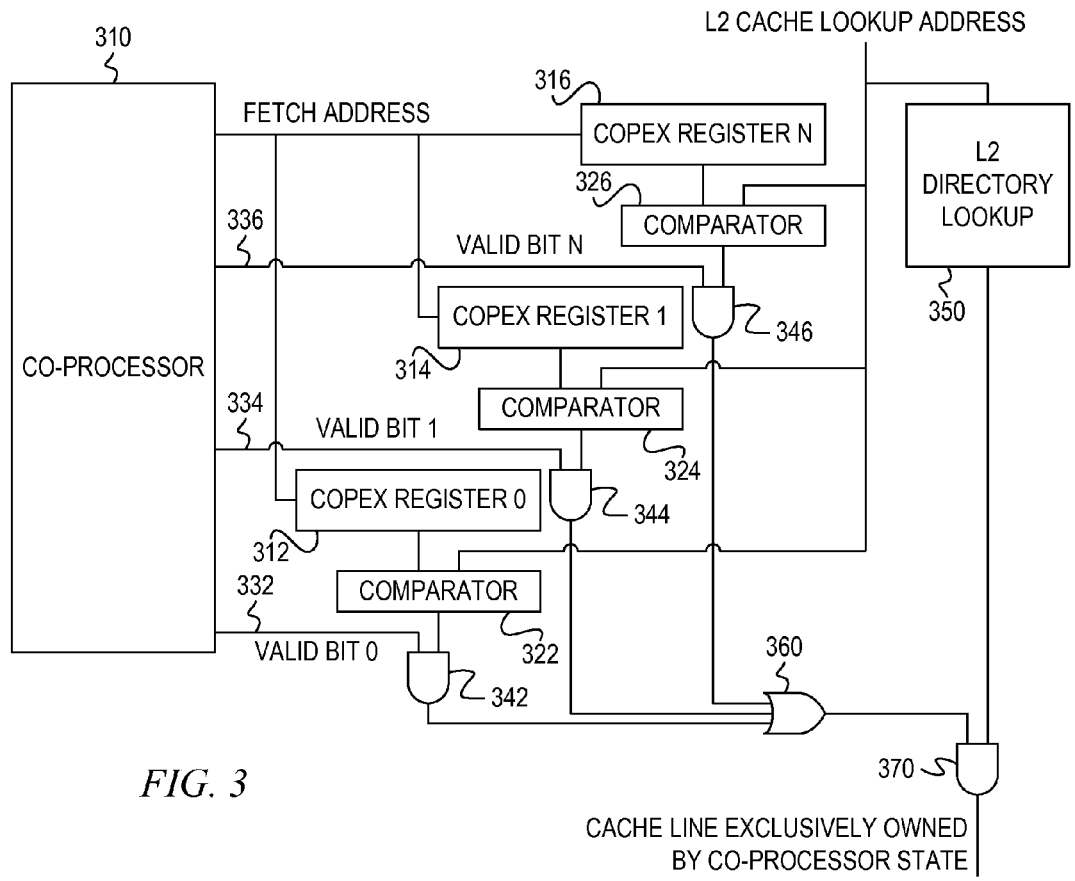
FIG. 3 illustrates a level two cache lookup mechanism for avoiding cross-interrogates for a streaming data optimized level one cache in accordance with an illustrative embodiment.

FIG. 3 illustrates a level two cache lookup mechanism for avoiding cross-interrogates for a streaming data optimized level one cache in accordance with an illustrative embodiment. The L2 cache implements a set of copex registers 312, 314, 316. For example, an implementation may require three copex registers to allow storing into two cache lines in parallel for line-crossing stores and pre-fetching a third cache line that is to be used next. The number of copex registers 0-N, 312-316 may vary depending upon the implementation.

On a fetch for an exclusive cache line from co-processor 310, co-processor 310 indicates for which copex register the fetch is intended. The L2 cache writes the fetch address into the indicated copex register 312-316. In one embodiment, the L2 cache writes the full fetch address; however, in an alternative embodiment, L2 cache limits the address portion held in the copex register to fewer bits than the full address, e.g., to those bits that are also used as an index into the L2 cache.

When doing a fetch for a given copex register, the co-processor always orders the L2 cache to overwrite the old contents of the copex register. Thus, the cache line that was previously fetched for this copex register is implicitly "given back" to the L2 cache (i.e., not considered exclusively owned by the co-processor anymore). For each copex register, co-processor 310 sets a bit (valid bit 0-N) 332, 334, 336 that indicates validity of the copex register. All valid bits 0-N 332-336 are sent in parallel to the L2 cache. If a valid bit is off (de-asserted), co-processor 310 must not store in the cache line that was previously fetched to this copex register. Co-processor 310 must also never re-assert the valid bit without sending a new fetch request to the L2 cache to exclusively get the cache line back again. This means that co-processor 310 cannot turn the copex register valid bit 332-336 for a cache line on and off several times without re-fetching the cache line. If co-processor 310 finishes an operation, such as encrypting some area of memory, co-processor 310 clears all copex register valid bits 0-N 332-336.

On any L2 cache operation that requires a directory lookup, the L2 cache receives a L2 cache lookup address. Comparators 322, 324, 326 compare the L2 cache lookup address in parallel to L2 directory lookup 350 against the contents of copex registers 312, 314, 316, respectively. AND gates 342, 344, 346 perform an AND operation with valid bits 332-336 and respective outputs from comparators 322-326 as inputs. For example, AND gate 342 performs an AND operation on valid bit 0 332 and output from comparator 322. Thus, the output of AND gate 342 is asserted if valid bit 0 332 is asserted and the contents of copex register 0 312 matches the L2 cache lookup address; the output of AND gate 344 is asserted if valid bit 1 334 is asserted and the contents of copex register 1 314 matches the L2 cache lookup address; and, the output of AND gate 346 is asserted if valid bit N 336 is asserted and the contents of copex register N 316 matches the L2 cache lookup address. OR gate 360 receives the outputs of AND gates 342-346 as inputs such that the output of OR gate 360 is asserted if any valid copex register matches the L2 cache lookup address. AND gate 370 receives the output of OR gate 360 and the result of L2 directory lookup 350.

In this manner, the L2 cache compares the L2 cache lookup address to the copex registers 312-316 in parallel with L2 directory lookup 350. If there is no "hit" against the copex registers, i.e., the cache line for which the lookup is intended is not in any valid copex register or copex register address range (if the copex registers do not store full addresses), then the L2 cache ignores the L2 directory bit that indicates that the cache line would be held exclusively in the co-processor. Thereby, the L2 cache will not recognize the cache line as being exclusively held in the co-processor. As a result, if co-processor 310 turns off valid bits 332-336 for copex registers 312-316, the L2 cache does not consider any cache lines to be "owned" by co-processor 310.

In practice, the mechanism of the illustrative embodiments may set the "line owned exclusively by co-processor" state bits ("copex" bits) in the L2 directory lookup 350 and never clear them. This is not a problem if the copex registers are implemented with the full fetch address width. However, if the L2 cache only performs partial address compares between the L2 cache lookup address and the copex registers 312-316, then there are cases where the address compare against the copex registers indicates that the line is in use by the co-processor and the L2 directory lookup 350 indicates that the line is found to have its copex bit set, but the addresses differ outside the range of the address compare. As a result of this incomplete compare, the processor would send a cross-interrogate (XI) to co-processor 310 even though co-processor 310 does not own the cache line anymore. As an optimization, in an example embodiment, responsive to any update of its directory state that does not set the copex bit, the L2 cache explicitly clears the copex bit in L2 directory lookup 350. That way, the L2 cache can clear the copex bits by normal L2 cache operations without requiring any separate directory accesses.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 4:
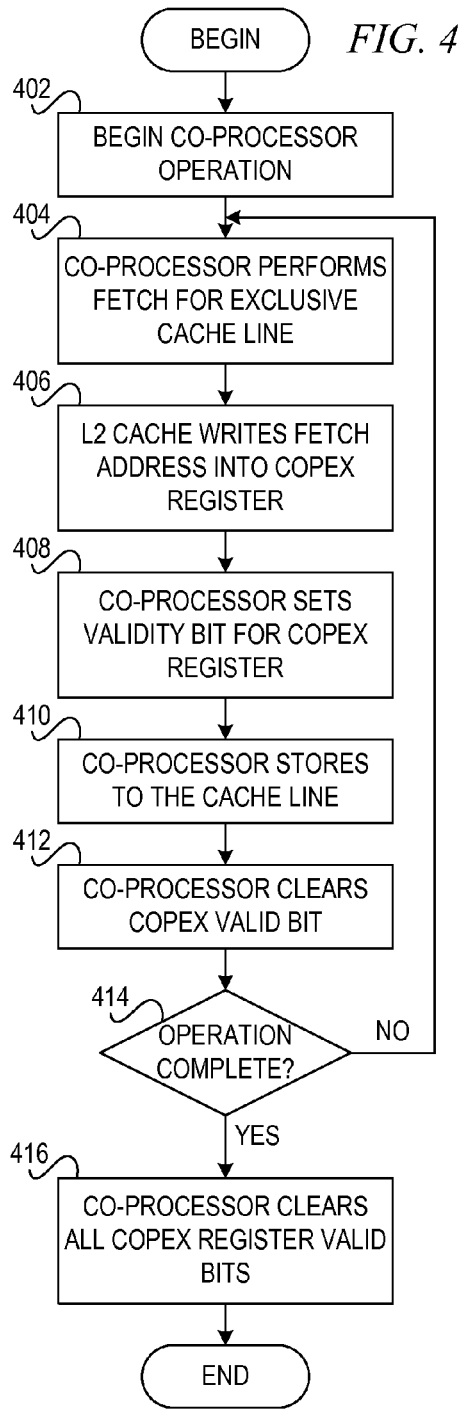
FIG. 4 is a flowchart illustrating operation of a level two cache lookup mechanism in accordance with an illustrative embodiment.

FIG. 4 is a flowchart illustrating operation of a level two cache lookup mechanism in accordance with an illustrative embodiment. Operation begins, and the co-processor begins an operation (block 402) and performs a fetch for an exclusive cache line (block 404). The level two (L2) cache writes the fetch address into a corresponding copex register (block 406). The co-processor sets the validity bit for the copex register (block 408). Then, the co-processor stores to the cache line (block 410) and clears the copex valid bit (block 412).

Thereafter, the co-processor determines whether the operation is complete (block 414). If the operation is not complete, then operation returns to block 404, and the co-processor performs another fetch for an exclusive cache line, and operation repeats until the co-processor completes the operation. If the co-processor operation is complete in block 414, then the co-processor clears all copex register valid bits (block 416), and operation ends.

Figure 5:
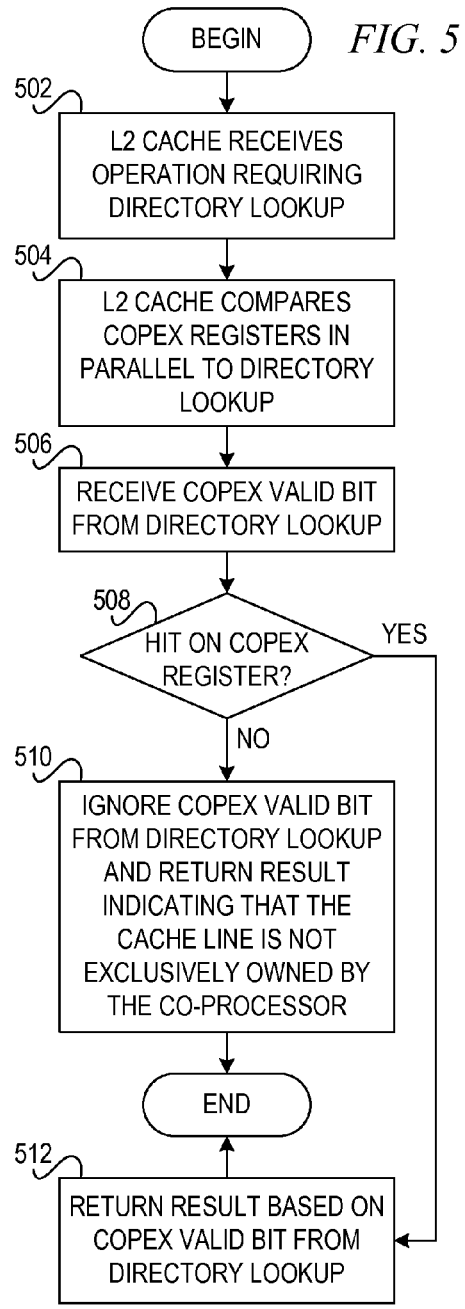
FIG. 5 is a flowchart illustrating operation of a level two cache lookup for avoiding cross-interrogates for a streaming data optimized level one cache in accordance with an illustrative embodiment.

FIG. 5 is a flowchart illustrating operation of a level two cache lookup for avoiding cross-interrogates for a streaming data optimized level one cache in accordance with an illustrative embodiment. Operation begins, and the level two (L2) cache receives an operation requiring a directory lookup (block 502). The L2 cache compares the copex registers to the L2 cache lookup address in parallel with the L2 directory lookup (block 504). The L2 cache receives the copex valid bit from the directory lookup (block 506).

The L2 cache determines whether the comparison of the copex registers to the L2 cache lookup address results in a hit on a copex register (block 508). If there is not a hit on a copex register, the L2 cache ignores the copex valid bit from the directory lookup and returns a result indicating that the cache line is not exclusively owned by the co-processor (block 510). Thereafter, operation ends.

If there is a hit on a copex register in block 508, the L2 cache returns a result based on the copex valid bit from the directory lookup (block 512). Thereafter, operation ends.

Figure 6:
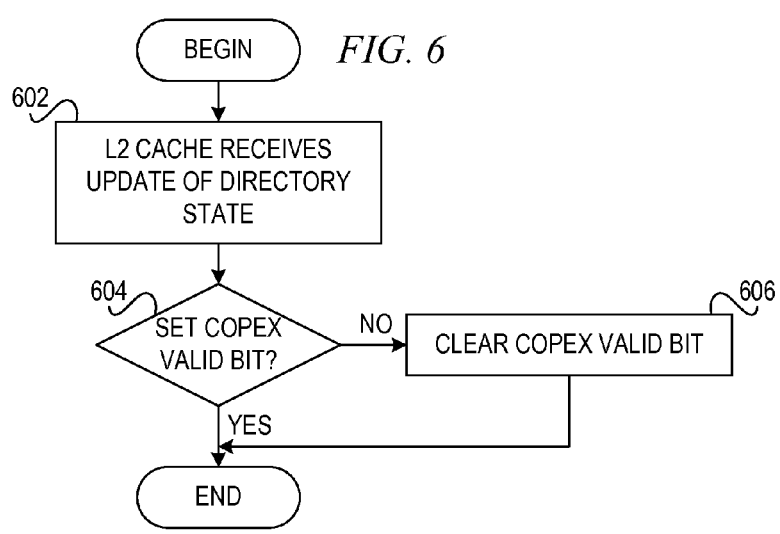
FIG. 6 is a flowchart illustrating operation of a level two cache in accordance with on example embodiment.

FIG. 6 is a flowchart illustrating operation of a level two cache in accordance with an example embodiment. Operation begins, and the level two (L2) cache receives an update of a directory state (block 602). The L2 cache determines whether the update requires setting a copex valid bit (block 604). If the update requires setting a copex valid bit, operation ends. If the update does not require setting a copex valid bit, then the L2 cache clears the corresponding "line owned exclusively by co-processor" valid bit (block 606), and operation ends.

In a L2 cache, there are various operations on a cache line that require updating the directory state of the cache line. For example, on each fetch from a L1 cache that hits in the L2 cache, the L2 cache updates a bit in the directory that indicates that this L1 cache now owns the line. Such an update can usually affect many or all directory state bits at "no cost." Therefore, the embodiment uses this "no cost" mechanism to always clear the "line owned exclusively by co-processor" state bit if the compare against the copex registers does not indicate that co-processor currently owns the line. This is a write operation where the L2 cache does not check whether the "line owned exclusively by co-processor" state bit is set. This has the advantage of cleaning up stale "line owned exclusively by co-processor" bits, i.e., for lines that were previously held by the co-processor, but are not anymore.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for avoiding cross-interrogates for a streaming data optimized level one cache. The mechanism adds a set of dedicated registers, referred to as "copex registers," to track ownership of the cache lines that the co-processor's L1 cache holds exclusive. The mechanism extends the cache directory of the L2 cache by a bit that identifies exclusive ownership of a cache line in the co-processor cache. The co-processor continuously provides an indication of which copex registers are valid. On any action that requires a directory lookup in the L2 cache, the mechanism compares the valid copex registers against the lookup address in parallel to the directory lookup. The mechanism considers the "exclusive ownership in co-processor" bit in the directory valid only if the cache line is also currently in a valid copex register.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for avoiding cross interrogates for a streaming data optimized cache, the method comprising:
   receiving from a first processor a fetch operation for a cache line to be exclusively held by the first processor, wherein the fetch operation includes a fetch address;
   receiving from the first processor an indication of a selected register from a set of registers for tracking exclusive ownership of the cache line by the first processor;
   writing the fetch address into the selected register;
   responsive to receiving an operation from a second processor requiring cache directory lookup for a lookup address, performing a comparison of the lookup address to the set of registers; and
   determining whether the first processor exclusively owns a cache line corresponding to the lookup address based on the comparison.

2. The method of claim 1, wherein the first processor is a co-processor.

3. The method of claim 1, wherein the first processor sets a validity bit for the selected register.

4. The method of claim 3, wherein performing the comparison of the lookup address to the set of registers comprises comparing each register from the set of registers to the lookup address and returning a hit if a given register from the set of registers matches the lookup address and a validity bit corresponding to the given register is set.

5. The method of claim 3, wherein responsive to the first processor completing an operation involving the cache line to be exclusively held by the first processor, the first processor clears all valid bits.

6. The method of claim 1, wherein writing the fetch address has a with that is a portion of a full line address width.

7. The method of claim 1, wherein determining whether the first processor exclusively owns the cache line corresponding to the lookup address comprises:
   determining that the first processor exclusively owns the cache line corresponding to the lookup address if the comparison indicates that the lookup address matches a given register in the set of registers and a cache directory lookup indicates that the first processor exclusively owns the cache line corresponding to the lookup address.

8. The method of claim 1, wherein determining whether the first processor exclusively owns the cache line corresponding to the lookup address comprises:
   determining that the first processor does not exclusively own the cache line corresponding to the lookup address if the comparison indicates that the lookup address does not match a register in the set of registers or a cache directory lookup indicates that the first processor does not exclusively own the cache line corresponding to the lookup address.

9. A computer program product comprising a computer readable storage medium having a computer readable program stored therein, wherein the computer readable program, when executed on a computing device, causes the computing device to:
   receive from a first processor a fetch operation for a cache line to be exclusively held by the first processor, wherein the fetch operation includes a fetch address;
   receive from the first processor an indication of a selected register from a set of registers for tracking exclusive ownership of the cache line by the first processor;
   write the fetch address into the selected register;
   responsive to receiving an operation from a second processor requiring cache directory lookup for a lookup address, perform a comparison of the lookup address to the set of registers; and
   determine whether the first processor exclusively owns a cache line corresponding to the lookup address based on the comparison.

10. The computer program product of claim 9, wherein the computer readable program is stored in a computer readable storage medium in a data processing system and wherein the computer readable program was downloaded over a network from a remote data processing system.

11. The computer program product of claim 9, wherein the computer readable program is stored in a computer readable storage medium in a server data processing system and wherein the computer readable program is downloaded over a network to a remote data processing system for use in a computer readable storage medium with the remote system.

12. A cache lookup apparatus, comprising:
   a set of registers;
   a set of comparators, wherein each comparator within the set of comparators corresponds to a register within the at of registers; and
   a cache directory,
   wherein the cache lookup apparatus receives from a first processor a fetch operation for a cache line to be exclusively held by the first processor, wherein the fetch operation includes a fetch address;
   wherein the cache lookup apparatus receives from the first processor an indication of a selected register from the set of registers for tracking exclusive ownership of the cache line by the first processor;
   wherein the cache lookup apparatus writes the fetch address into the selected register;
   wherein responsive to receiving an operation from a second processor requiring cache directory lookup for a lookup address, the cache lookup apparatus performs a comparison of the lookup address to the set of registers; and
   wherein the cache lookup apparatus determines whether the first processor exclusively owns a cache line corresponding to the lookup address based on the comparison and a lookup of the lookup address in the cache directory.

13. The cache lookup apparatus of claim 12, wherein the first processor is a co-processor.

14. The cache lockup apparatus of claim 12, wherein the first processor, the second processor, and the cache lookup apparatus are embodied on a system-on-a-chip.

15. The cache lookup apparatus of claim 12, wherein the first processor sets a validity bit for the selected register.

16. The cache lookup apparatus of claim 15, wherein performing the comparison of the lookup address to the set of registers comprises comparing each register from the set of registers to the lookup address and returning a hit if a given register from the set of registers matches the lookup address and a validity bit corresponding to the given register is set.

17. The cache lookup apparatus of claim 15, wherein responsive to the first processor completing an operation involving the cache line to be exclusively held by the first processor, the first processor clears all valid hits.

18. The cache lookup apparatus of claim 12, wherein writing the fetch address has a width that is a portion of a full line address width.

19. The cache lookup apparatus of claim 12, wherein determining whether the first processor exclusively owns the cache line corresponding to the lookup address comprises:
   determining that the first processor exclusively owns the cache line corresponding to the lookup address if the comparison indicates that the lookup address matches a given register in the set of registers and a cache directory lookup indicates that the first processor exclusively owns the cache line corresponding to the lookup address.

20. The cache lookup apparatus of claim 12, wherein determining whether the first processor exclusively owns the cache line corresponding to the lookup address comprises:
   determining that the first processor does not exclusively own the cache line corresponding to the lookup address if the comparison indicates that the lookup address does not match a register in the set of registers or a cache directory lookup indicates that the first processor does not exclusively own the cache line corresponding to the lookup address.

* * * * *